3,554,936
STABLE HIGH EXPANSION FOAM COMPOSITION AND PROCESS OF FOAMING
George L. Braude, Ellicott City, Joseph A. Cogliano, Baltimore, and Edwin W. Lard, Bowie, Md., assignors to W. R. Grace & Co., New York, N.Y., a corporation of Connecticut
No Drawing. Filed Mar. 26, 1968, Ser. No. 715,969
Int. Cl. C08f 47/10; C08j 1/16
U.S. Cl. 260—2.5     5 Claims

ABSTRACT OF THE DISCLOSURE

A flowable stable high expansion foam composition based on a urea-formaldehyde resin is provided having good strength properties and a retarded setting time. In addition a process of foaming is provided which produces a high strength, high expansion foam from a number of foam systems. This process also enables improved generation and transport of the high expansion foams through enclosed areas by intermittently foaming the aqueous pre-foam composition and passing it through an enclosed area.

---

This invention relates to the generation of high expansion high strength foam compositions and to a method of transporting these compositions easily through pipe lines or such enclosed areas. In a particular embodiment, this invention relates to a new stable high expansion urea-formaldehyde pre-foam composition which lends itself to generation in our new process. In another embodiment, this invention relates to a urea-formaldehyde foam composition having a high expansion ratio of about 100–1200, and preferably 200–700 and a slow set-up time with a high strength characteristic. This invention also relates to a means of foaming this urea-formaldehyde prefoam composition and for decreasing the back pressure developed when the foam is transported through an enclosed pipe or tube.

Urea-formaldehyde based foams are well known in the art. Generally the urea-formaldehyde resin is purchased in an aqueous prepolymer suspension. Air and a catalyst is then incorporated into the suspension to which surfactants have been added. Alternately, a chemical blowing agent may be incorporated in the mix prior to blowing. A foam of this type, however, sets up rapidly and has a relatively low expansion ratio. The expansion ratio is the ratio between the final volume of the foam and the volume of the liquid resin composition. Generally, the foams of the prior art have expansion ratios not exceeding 100 or 200. This low expansion ratio is due to the fact that acceptable dimensional stability and strength after hardening can only be obtained at a low expansion ratio.

We have now found a means whereby a urea-formaldehyde pre-foam composition is provided which has an expansion ratio of about 100–1200 and high strength for the expansion ratio, and a slow set-up time. In summary, seven main components are required in the composition to give favorable foam products, as follows: (A) a urea-formaldehyde resin is present from about 10 to 50 parts by weight; (B) an anionic surface active agent is present from about 0.1 to 10 parts per weight; (C) an acid catalyst which is employed in about 0.01–0.05 part per weight; (D) 0.1–5 parts by weight of an additive to strengthen the foam in its "liquid" phase, which prevents collapse of the foamed structure before hardening, chosen from the group of long chain fatty alcohols, preferably $C_{12}$–$C_{14}$ lauryl alcohol; (E) 1–20 parts by weight of a polyalcohol chosen from the group consisting of ethylene glycol, glycerine, glycols, and glycerols, the polyalcohol increasing the liquid film strength of the foamed composition; (F) 0.5–5 parts per weight of an additive to increase the strength of the foam in the "solid" or hardened phase, said additive chosen from the group consisting of furfuryl alcohol or a vinylpyrrolidone-vinyl acetate copolymer; (G) and 20–400 parts by weight of water. These components are selected so that the solids content of the final pre-foam composition is between 5–50% by weight.

The urea-formaldehyde resin used in the pre-foam composition can be in the form of anhydrous solid or an aqueous urea-formaldehyde resin of an adhesive and textile grade, having 50–70% solids. It is obvious that when the aqueous resin is employed, the amount of water added is adjusted so that the solids content of the pre-foam composition is within the 5–50% by weight range.

The process of forming a stable, high expansion urea-formaldehyde foam from the above pre-foam composition may be any conventional method. However, we prefer to use the following technique; the composition (herein called the "prefoam composition") is continuously sprayed onto a fabric or wire mesh so as to evenly cover the mesh surface. A continuous current of air or gas is passed through the mesh. The ratio of liquid and air stream is critical because it predetermines the expansion ratio of the foam produced. Generally, we have found the following parameters operable for the preferred foam systems: The volume of air per volume of liquid pumped may range from 100 to about 1200 and is preferably between 300 and 650. Under these conditions from 6 to 70 cubic feet of expanded foam per minute per square foot of mesh may be produced. This corresponds to a linear velocity through the mesh of 6 to 70 feet per minute.

The applications and uses for our new urea-formaldehyde foam composition are limited only by its exceptional properties. The foam produced has a high expansion ratio thereby requiring only a relatively small amount of raw material per cubic foot of foamed produced and therefore has a low volume cost. The prepolymer foam has a long duration liquid stability which permits flowing or pumping the foam to remote areas, through tunnels or ducts. Additionally the foam will not collapse during slow or rapid pumping in or outdoors while in liquid state. As an added advantage the foam of our composition will harden to a strong noncollapsing structure completely filling the void areas provided.

Related to this duration of liquid stability we have found that a transport treatment is necessary to move the foams through pipes, ducts or tunnels with a minimum of back pressure. To understand why this is essential it must be pointed out that a conventional flowable foam when pumped through a long pipe, duct, tunnel, mine shaft or the like exerts considerable back pressure. The back pressure is caused by internal friction and the wall friction of the moving foam column and results in greatly increased difficulty of pumping or blowing additional foam through and into the structure after a certain distance from the starting point has been reached. It has now been found in our invention that considerably greater distances of the foam travel can be achieved by the intermittent feeding of the liquid foam base solution through the generating equipment.

This novel technique of adjusting the flow properties of foam is applicable to any foam which has a liquid stability suitable to transport. While the novel urea-formaldehyde pre-foam composition described herein is eminently suitable for the transport process, other foam systems, such as polyvinylalcohol foams, high expansion fire-fighting foams, surfactant foams, and others can be used with equal success.

Throughout this patent we employ the term of "pre-foam composition" to mean any suitable aqueous suspension of solids which produces a foam when treated according to our invention.

In summary, our foam transport process conists of intermittently spraying the chosen pre-foam composition into the mesh support while continuously blowing air through the screen. The feed of pre-foam composition is regulated so that there are periods during which no composition is on the mesh.

The passage of air through the screen bubbles into the pre-foam composition, thereby foaming the composition. As more foam is formed, the foam can be pushed off the screen and moved by the force of its own mass. The fan which blows the air is the drive means of transporting the foam.

This results in turn in the formation and transport of "slugs" of foam which move through a constricted area with greatly reduced friction. We have found that when this process is applied to a suitable foam composition, the foam will completely fill all available space where it is intended to go. In addition, while being moved, only a very slight amount of back pressure will develop due to the protective pockets of air between the individual slugs of foam.

Obviously, the size of the screen, the fan, and the amount of pre-foam sprayed onto the screen determine the final expansion ratio of the foam. These parameters must all be adjusted for the specific pre-foam system used, and cannot be given definite values.

This invention will be more clearly understood by reference to the following examples.

EXAMPLE 1

The following ingredients were mixed in a 50 gallon resin kettle: 35 parts by weight of urea-formaldehyde adhesive grade resin having 65% solids; 4 parts by weight of an ammonium salt of a linear alcohol ethoxylate sulfate (an anionic surface active agent); 1 part by weight lauryl alcohol; 5 parts by weight ethylene glycol; 5 parts by weight furfuryl alcohol; 0.01 part by weight of 0.5 N sulfuric acid and about 50 parts by weight water.

This mixture was stirred to insure a homogeneous blend and then continuously sprayed onto a wire mesh screen at the rate of 25 gallons per minute. The screen had a 22 square ft. surface area. Air was blown continuously through the screen by means of a fan at the rate of 1500 cu. ft./min. A free-flowing foam was produced, having an expansion ratio of 450:1 and a liquid stability of 30 to 60 minutes. When the foam hardened it was a strong non-collapsing structure.

EXAMPLE 2

The following ingredients were mixed together: 45 parts by weight of urea-formaldehyde adhesive grade resin having 65% solids; 2 parts by weight of an ammonium salt of a linear alcohol ethoxylate sulfate; 0.02 part by weight of ammonium sulfate; 2 parts by weight lauryl alcohol; 11 parts by weight glycerine; 4 parts by weight furfuryl alcohol and 36 parts by weight water. This mixture was stirred to insure a homogeneous blend and then fed at the rate of 10 gallons per minute into a commercially available mixing chamber, which produced a foam using compressed air at the rate of 150 cubic ft./min. The wet foam had good liquid stability of about 45 minutes. The finished solid foam had an expansion ratio of about 120:1 and a strong non-collapsing structure.

EXAMPLE 3

A polyvinyl alcohol pre-foam composition was prepared by mixing 1 part by weight of polyvinyl alcohol; 4 parts by weight of a surface active agent of the long chain alcohol-ether ammonium sulfate type; 1 part by weight of lauryl alcohol; 10 parts by weight of glycerin and 84 parts by weight of water.

This mixture was continuously sprayed onto a fabric mesh cloth through which a continuous current of air or gas was passed. The ratio of liquid feed to air was adjusted to produce an expansion ratio of 500. The foam was passed into a duct 3′ x 3′ in cross section and penetrated to a distance of 140 feet. At this point back pressure in the unit had built up to 4 inches of water, balancing the ability of the fan to push the foam column further through the duct.

EXAMPLE 4

The foam composition was prepared as described in Example 2. The foam mixture was sprayed on the mesh through which the continuous current of air was passing. The liquid flow was interrupted every 5 seconds for 2 seconds duration. The foam readily penetrated to the end of 200 ft. duct 3′ x 3′ in cross section. The back pressure was 2.5 inches of water. When the interval between liquid flow was increased to 5 seconds every 5 seconds a back pressure of 1.8 inches of water was measured.

EXAMPLE 5

A high-expansion firefighting type foam concentrate was prepared consisting of 6–25 parts by weight of an ammonium lauryl ether sulfate, 1–10 parts by weight of a stabilizing additive chosen from the group consisting of lauryl alcohol or myristyl alcohol, and 17–93 parts by weight of a diethylene glycol monoalkyl ether. 1.5 parts by weight of the concentrate was mixed with 98.5 parts by weight water and foamed following the procedure used in Example 4. The foam penetrated to the end of the 3′ x 3′ x 200′ duct. The finished foam had an expansion ratio of 900:1.

EXAMPLE 6

Using the same pre-foam composition prepared in Example 5, but using the continuous feed process of foaming described in Example 3, a foam was passed into the 3′ x 3′ x 200′ duct. After 110 feet, back pressure had built up to 4 inches of water, balancing the ability of the fan to push the foam column further through the duct.

Having fully described this invention, what is claimed is:

1. A urea-formaldehyde pre-foam composition comprising from 10–50 parts by weight of a urea-formaldehyde resin, 0.1–10 parts by weight of an anionic surface active agent, 0.01–0.05 part by weight of an acid catalyst, 0.1–5 parts by weight of lauryl alcohol, 1–20 parts by weight of an additive chosen from the group consisting of glycols and glycerols, and 0.05–5 parts by weight of furfuryl alcohol, and 20–400 parts by weight of water; the amount of each component selected so that the solids content of the composition is 5–50% by weight.

2. The composition of claim 1 in which the urea-formaldehyde resin is employed in a form chosen from the group consisting of an aqueous suspension having 50–70% solids content, and an anhydrous solid.

3. The composition of claim 1 in which the anionic surface active agent is an ammonium salt of a linear alcohol ethoxalate sulfate.

4. The composition of claim 1 in which the acid catalyst is chosen from the group consisting of sulfuric acid and ammonium sulfate.

5. A foam composition characterized by having an expansion ratio of 200 to 700, a slow set-up time and high strength in the solid foam form which comprises 10-50 parts by weight of a urea-formaldehyde resin, 0.1-10 parts by weight of an anionic surface active agent, 0.01-0.05 part by weight of an acid catalyst, 0.1-5 parts by weight of lauryl alcohol, 1-20 parts by weight of an additive chosen from the group consisting of glycols and glycerols, and 0.5-5 parts by weight of furfuryl alcohol, and 20-400 parts by weight of water; the foam composition having 5-50% by weight solids.

References Cited

UNITED STATES PATENTS

| | | | |
|---|---|---|---|
| 2,378,322 | 6/1945 | Peterson | 260—2.5F |
| 3,006,871 | 10/1961 | Sunderland | 260—2.5F |
| 3,231,525 | 1/1966 | Kelly et al. | 260—2.5F |
| 3,414,526 | 12/1968 | Mason | 260—29.4 |

SAMUEL H. BLECH, Primary Examiner

M. FOELAK, Assistant Examiner

U.S. Cl. X.R.

260—29.4, 33.4, 829, 851